United States Patent
Takeda et al.

(10) Patent No.: US 9,678,849 B2
(45) Date of Patent: Jun. 13, 2017

(54) PROCESSING METHOD, PROCESSING APPARATUS, AND RECORDING MEDIUM TO DETERMINE OPERATIONAL STATE OF PROCESSING ELEMENT

(71) Applicant: FUJITSU LIMITED, Kawasaki-shi, Kanagawa (JP)

(72) Inventors: Toshio Takeda, Machida (JP); Youichi Ehara, Hiratsuka (JP); Junichi Yamazaki, Mishima (JP); Shinya Echigo, Yokohama (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 630 days.

(21) Appl. No.: 14/061,791

(22) Filed: Oct. 24, 2013

(65) Prior Publication Data
US 2014/0165064 A1  Jun. 12, 2014

(30) Foreign Application Priority Data
Dec. 10, 2012 (JP) ................. 2012-269416

(51) Int. Cl.
G06F 9/46 (2006.01)
G06F 11/30 (2006.01)
G06F 11/34 (2006.01)

(52) U.S. Cl.
CPC ...... *G06F 11/3082* (2013.01); *G06F 11/3006* (2013.01); *G06F 11/3409* (2013.01); *G06F 2201/81* (2013.01)

(58) Field of Classification Search
None
See application file for complete search history.

(56) References Cited

U.S. PATENT DOCUMENTS

2006/0015612 A1  1/2006 Shimazaki et al.
2006/0117100 A1* 6/2006 Ogawa .............. H04L 63/20
                                                              709/223
(Continued)

FOREIGN PATENT DOCUMENTS

JP      10-091581      4/1998
JP   2005-346414      12/2005
(Continued)

OTHER PUBLICATIONS

Japanese Office Action mailed Jun. 14, 2016 in related Japanese Application No. 2012-269416.
(Continued)

*Primary Examiner* — Tammy Lee
(74) *Attorney, Agent, or Firm* — Staas & Halsey LLP

(57) ABSTRACT

A processing method includes: collecting processing information indicating a processing state of an application executed by an information processing device and operational information indicating operational states of processing elements that are identified on the basis of configuration information stored in a storage unit and are involved in the execution of the application; determining whether or not there is a correlation between the processing state and an operational state of each of the processing elements on the basis of the processing information and the operational information when a delay of a process of the application is detected on the basis of the processing information; and extracting, from among the processing elements, a processing element of which an operational state has a correlation with the processing state on the basis of the determination.

15 Claims, 14 Drawing Sheets

(56) References Cited

U.S. PATENT DOCUMENTS

| | | | |
|---|---|---|---|
| 2006/0190596 A1 | 8/2006 | Horikawa | |
| 2007/0198529 A1* | 8/2007 | Ogawa | G06F 11/3419 |
| 2008/0228914 A1* | 9/2008 | Ofel | H04L 12/2697 |
| | | | 709/224 |
| 2010/0115088 A1 | 5/2010 | Sakai et al. | |
| 2011/0307602 A1 | 12/2011 | Kanemasa | |

FOREIGN PATENT DOCUMENTS

| | | |
|---|---|---|
| JP | 2006-11902 | 1/2006 |
| JP | 2006-227999 | 8/2006 |
| JP | 2010-108445 | 5/2010 |
| JP | 2010-231825 | 10/2010 |
| JP | 2011-258057 | 12/2011 |

OTHER PUBLICATIONS

Japanese Office Action dated Aug. 30, 2016 in corresponding Japanese Patent Application No. 2012-269416.

* cited by examiner

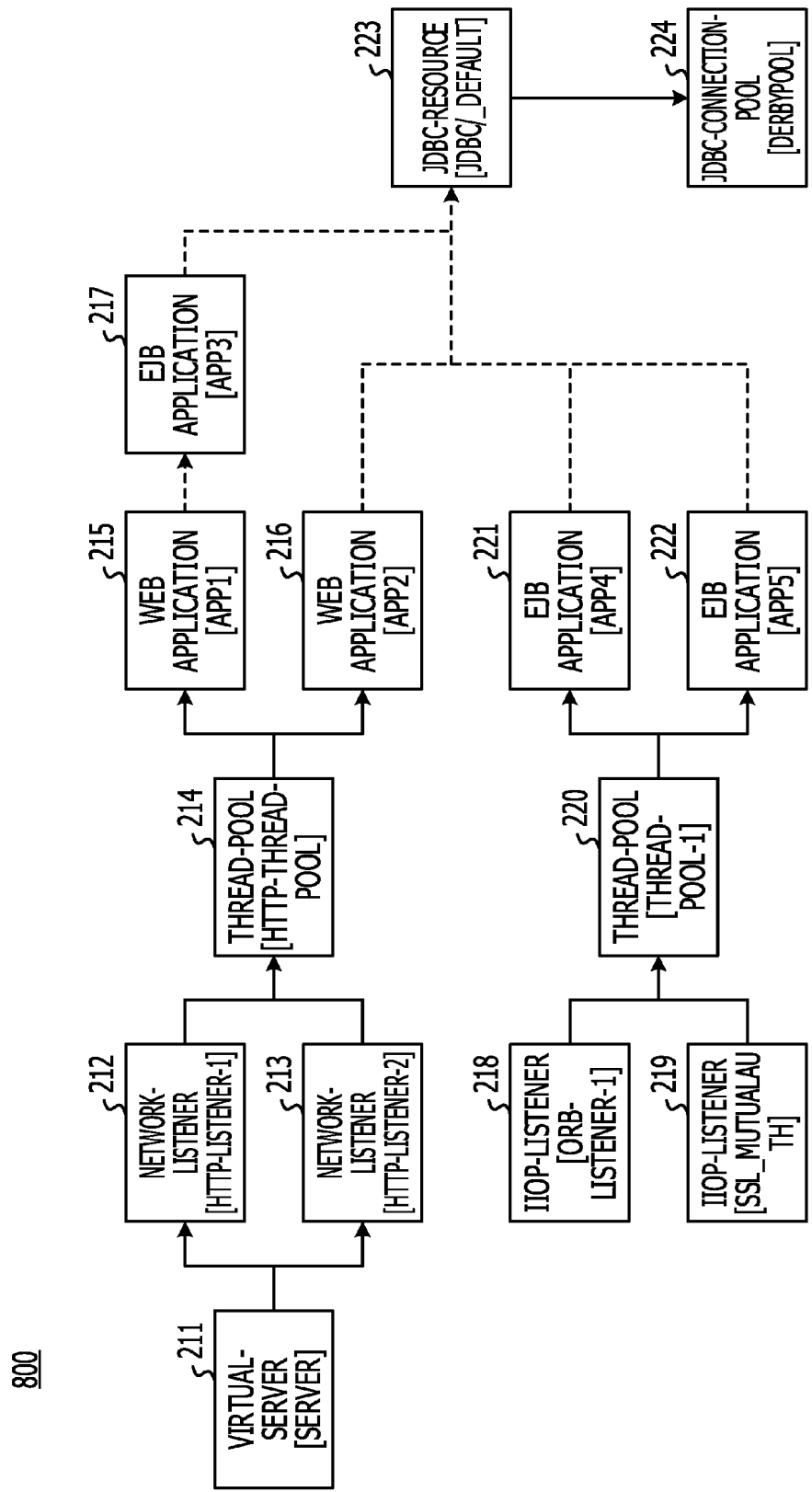

FIG. 5

```xml
<?xml version="1.0"?>
...
<system-applications/>
<applications/>
<resources>
<jdbc-resource object-type="system-admin" jndi-name="jdbc/__TimerPool" pool-name="__TimerPool"/>               ─┐
<jdbc-resource jndi-name="jdbc/__default" pool-name="DerbyPool"/>                                                │ 901
<jdbc-connection-pool res-type="javax.sql.XADataSource" datasource-                                              │
classname="org.apache.derby.jdbc.ClientXADataSource40" name="__TimerPool">                                       │
<property name="PortNumber" value="1527"/>                                                                      ─┘
</jdbc-connection-pool>
<jdbc-connection-pool res-type="javax.sql.DataSource" datasource-classname="org.apache.derby.jdbc.ClientDataSource"  ─┐
 name="DerbyPool" is-isolation-level-guaranteed="false">                                                              │ 902
<property name="PortNumber" value="1527"/>                                                                           ─┘
</jdbc-connection-pool>
</resources>
<servers>
<server name="server" config-ref="server-config">          ─┐
<resource-ref ref="jdbc/__TimerPool"/>                      │ 903
<resource-ref ref="jdbc/__default"/>                       ─┘
</server>
...
CONTINUED ON FIG. 6
```

CONTINUED FROM FIG. 5

900

```
<network-listeners>
<network-listener name="http-listener-1" port="29292" thread-pool="http-thread-pool" transport="tcp" protocol="http-listener-1"/>
<network-listener name="http-listener-2" port="29393" thread-pool="http-thread-pool" transport="tcp" protocol="http-listener-2"/>                                                                      ⎫
<network-listener name="admin-listener" port="13021" thread-pool="admin-thread-pool" transport="tcp" protocol="admin-listener"/>                                                                       ⎬ 904
</network-listeners>                                                                                                                                                                                    ⎭
...
<thread-pools>
<thread-pool name="admin-thread-pool" max-queue-size="256" max-thread-pool-size="50"/>        ⎫
<thread-pool name="http-thread-pool" max-queue-size="4096"/>                                   ⎬ 905
<thread-pool name="thread-pool-1" max-thread-pool-size="200"/>                                 ⎭
</thread-pools>
...
<network-config>
<protocols>
<protocol name="http-listener-1">
<http default-virtual-server="server"/>
<file-cache/>                                                                                  ⎫
</http>                                                                                        ⎪
</protocol>                                                                                    ⎬ 906
<protocol name="http-listener-2" security-enabled="true">                                      ⎪
<http default-virtual-server="server"/>                                                        ⎪
<file-cache/>                                                                                  ⎭
</http>
...
</network-config>
```

FIG. 8

| | 1101 | 1102 | 1103 | 1104 | 1105 | 1106 | 1107 | 1108 |
|---|---|---|---|---|---|---|---|---|
| | ACQUISITION TIME | RESPONSE TIME | PROCESSING TIME OF ELEMENT A | PROCESSING TIME OF ELEMENT B | PROCESSING TIME OF ELEMENT C | PROCESSING TIME OF ELEMENT D | PROCESSING TIME OF ELEMENT E | PROCESSING TIME OF ELEMENT Z |
| | FEBRUARY 10, 2012, 10:00 | 1245 | 184 | 113 | 159 | 194 | 595 | 197 |
| | FEBRUARY 10, 2012, 10:01 | 2999 | 174 | 1887 | 176 | 195 | 567 | 165 |
| | FEBRUARY 10, 2012, 10:02 | 2111 | 151 | 1110 | 185 | 184 | 481 | 186 |
| | FEBRUARY 10, 2012, 10:03 | 1929 | 132 | 780 | 185 | 174 | 658 | 188 |
| | FEBRUARY 10, 2012, 10:04 | 1851 | 195 | 284 | 197 | 151 | 1024 | 128 |
| | FEBRUARY 10, 2012, 10:05 | 2299 | 175 | 808 | 185 | 184 | 947 | 197 |
| | FEBRUARY 10, 2012, 10:06 | 1358 | 104 | 7 | 184 | 174 | 889 | 148 |
| | FEBRUARY 10, 2012, 10:07 | 1696 | 194 | 287 | 174 | 151 | 890 | 198 |
| | FEBRUARY 10, 2012, 10:08 | 1515 | 195 | 133 | 151 | 132 | 904 | 164 |
| | FEBRUARY 10, 2012, 10:09 | 1875 | 184 | 481 | 132 | 104 | 974 | 122 |
| | FEBRUARY 10, 2012, 10:10 | 1655 | 174 | 215 | 174 | 185 | 907 | 165 |
| | FEBRUARY 10, 2012, 10:11 | 4957 | 151 | 1071 | 1857 | 1004 | 874 | 3279 |
| | FEBRUARY 10, 2012, 10:12 | 5285 | 132 | 1072 | 1940 | 1194 | 947 | 3857 |
| | FEBRUARY 10, 2012, 10:13 | 8521 | 104 | 3117 | 2132 | 2194 | 974 | 4865 |
| | FEBRUARY 10, 2012, 10:14 | 4856 | 185 | 1166 | 1394 | 1194 | 917 | 3211 |
| | FEBRUARY 10, 2012, 10:15 | 3856 | 159 | 874 | 874 | 975 | 974 | 2804 |
| | FEBRUARY 10, 2012, 10:16 | 2041 | 195 | 554 | 151 | 185 | 956 | 199 |
| | FEBRUARY 10, 2012, 10:17 | 1875 | 175 | 462 | 132 | 159 | 947 | 180 |
| | FEBRUARY 10, 2012, 10:18 | 2515 | 186 | 984 | 195 | 176 | 974 | 183 |
| | FEBRUARY 10, 2012, 10:19 | 2954 | 186 | 1501 | 175 | 175 | 917 | 151 |
| | FEBRUARY 10, 2012, 10:20 | 1880 | 159 | 432 | 186 | 186 | 917 | 163 |

1100

1110 (bracketing the bold rows)

| THRESHOLD (FOR RESPONSE TIME) [msec] |
|---|
| 3000 |

FIG. 12

$$\frac{\sum_{i=1}^{n}(x_i-\bar{x})(y_i-\bar{y})}{\sqrt{\sum_{i=1}^{n}(x_i-\bar{x})^2}\sqrt{\sum_{i=1}^{n}(y_i-\bar{y})^2}}$$

| ACQUISITION TIME | NUMBER OF STORED QUEUES |
|---|---|
| FEBRUARY 10, 2012, 10:00 | 3 |
| FEBRUARY 10, 2012, 10:01 | 4 |
| FEBRUARY 10, 2012, 10:02 | 3 |
| FEBRUARY 10, 2012, 10:03 | 2 |
| FEBRUARY 10, 2012, 10:04 | 3 |
| FEBRUARY 10, 2012, 10:05 | 4 |
| FEBRUARY 10, 2012, 10:06 | 6 |
| FEBRUARY 10, 2012, 10:07 | 5 |
| FEBRUARY 10, 2012, 10:08 | 3 |
| FEBRUARY 10, 2012, 10:09 | 4 |
| FEBRUARY 10, 2012, 10:10 | 5 |
| FEBRUARY 10, 2012, 10:11 | 12 |
| FEBRUARY 10, 2012, 10:12 | 15 |
| FEBRUARY 10, 2012, 10:13 | 18 |
| FEBRUARY 10, 2012, 10:14 | 14 |
| FEBRUARY 10, 2012, 10:15 | 13 |
| FEBRUARY 10, 2012, 10:16 | 6 |
| FEBRUARY 10, 2012, 10:17 | 3 |
| FEBRUARY 10, 2012, 10:18 | 1 |
| FEBRUARY 10, 2012, 10:19 | 2 |
| FEBRUARY 10, 2012, 10:20 | 4 |

| ACQUISITION TIME (1401) | RESPONSE TIME (NORMALIZED) (1402) | NUMBER (NORMALIZED) OF STORED QUEUES (1403) |
|---|---|---|
| FEBRUARY 10, 2012, 10:00 | 0 | 0.117647059 |
| FEBRUARY 10, 2012, 10:01 | 0.24106652 | 0.176470588 |
| FEBRUARY 10, 2012, 10:02 | 0.11902144 | 0.117647059 |
| FEBRUARY 10, 2012, 10:03 | 0.094007697 | 0.058823529 |
| FEBRUARY 10, 2012, 10:04 | 0.083287521 | 0.117647059 |
| FEBRUARY 10, 2012, 10:05 | 0.144859813 | 0.176470588 |
| FEBRUARY 10, 2012, 10:06 | 0.015530511 | 0.294117647 |
| FEBRUARY 10, 2012, 10:07 | 0.061984607 | 0.235294118 |
| FEBRUARY 10, 2012, 10:08 | 0.037108301 | 0.117647059 |
| FEBRUARY 10, 2012, 10:09 | 0.086586036 | 0.176470588 |
| FEBRUARY 10, 2012, 10:10 | 0.056349643 | 0.235294118 |
| FEBRUARY 10, 2012, 10:11 | 0.510170423 | 0.647058824 |
| FEBRUARY 10, 2012, 10:12 | 0.555250137 | 0.823529412 |
| FEBRUARY 10, 2012, 10:13 | 1 | 1 |
| FEBRUARY 10, 2012, 10:14 | 0.49628917 | 0.764705882 |
| FEBRUARY 10, 2012, 10:15 | 0.358851017 | 0.705882353 |
| FEBRUARY 10, 2012, 10:16 | 0.10940077 | 0.294117647 |
| FEBRUARY 10, 2012, 10:17 | 0.086586036 | 0.117647059 |
| FEBRUARY 10, 2012, 10:18 | 0.174546454 | 0 |
| FEBRUARY 10, 2012, 10:19 | 0.234881803 | 0.058823529 |
| FEBRUARY 10, 2012, 10:20 | 0.087273227 | 0.176470588 |

PROCESSING METHOD, PROCESSING APPARATUS, AND RECORDING MEDIUM TO DETERMINE OPERATIONAL STATE OF PROCESSING ELEMENT

CROSS-REFERENCE TO RELATED APPLICATION

This application is based upon and claims the benefit of priority of the prior Japanese Patent Application No. 2012-269416, filed on Dec. 10, 2012, the entire contents of which are incorporated herein by reference.

FIELD

The embodiment discussed herein is related to a processing method applied to an information processing system.

BACKGROUND

There is a known technique for causing a client device to request a server device to execute an application and causing the server device to execute the application in accordance with the request and transmit a result of the execution to the client device. The server device used for the technique is referred to as an application server, for example. A plurality of the application servers may be used in an information processing system.

During the execution of the application, a process from the reception of the request by the server device from the client device to the transmission of the execution result to the client device may be delayed by various causes. In order to resolve the delay of the process and operate the information processing system in a stable manner, the cause of the delay is identified and a system administrator quickly handles the delay. For such an event, there is a known technique for identifying an application server that is among a plurality of application servers used for the execution of applications and causes a delay and reducing a time period to resolve the delay occurred in an information processing system.

Japanese Laid-open Patent Publication No. 2011-258057 is known as an example of related art.

A process that is executed by an application server includes multiple execution units (processes) or processes (components) for the execution units. In order to resolve a delay, a component that is the cause of the delay of the process executed by the application server is identified, and measures are taken for the component identified as the cause of the delay.

The conventional techniques identify an application server causing a delay of a process, but may not identify a component causing the delay of the process in the identified application server. The component that causes the delay of the process is identified by a manual operation of a system administrator, for example. Thus, a time period to resolve the delay may be long. Especially, if the number of applications executed by the application server or the number of components within applications executed by the application server is large, the manual operation may be more cumbersome and the time period to resolve the delay may be longer.

SUMMARY

According to an aspect of the invention, a processing method includes: collecting processing information indicating a processing state of an application executed by an information processing device and operational information indicating operational states of processing elements that are identified on the basis of configuration information stored in a storage unit and are involved in the execution of the application; determining whether or not there is a correlation between the processing state and an operational state of each of the processing elements on the basis of the processing information and the operational information when a delay of a process of the application is detected on the basis of the processing information; and extracting, from among the processing elements, a processing element of which an operational state has a correlation with the processing state on the basis of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of information stored in a configuration information storage unit;
FIG. 5 illustrates an example of definition information of an application server;
FIG. 6 illustrates an example of the definition information of the application server;
FIG. 8 illustrates performance information;
FIG. 9 illustrates threshold information;
FIG. 12 illustrates a formula for calculation of a correlation function;
FIG. 13 illustrates an example of information that indicates transition of the number of queues stored in a thread pool;
and
FIG. 14 illustrates response times and the numbers of stored queues after normalization is executed by an analyzer.

DESCRIPTION OF EMBODIMENT

The embodiment is described with reference to the accompanying drawings.

Figure 1:
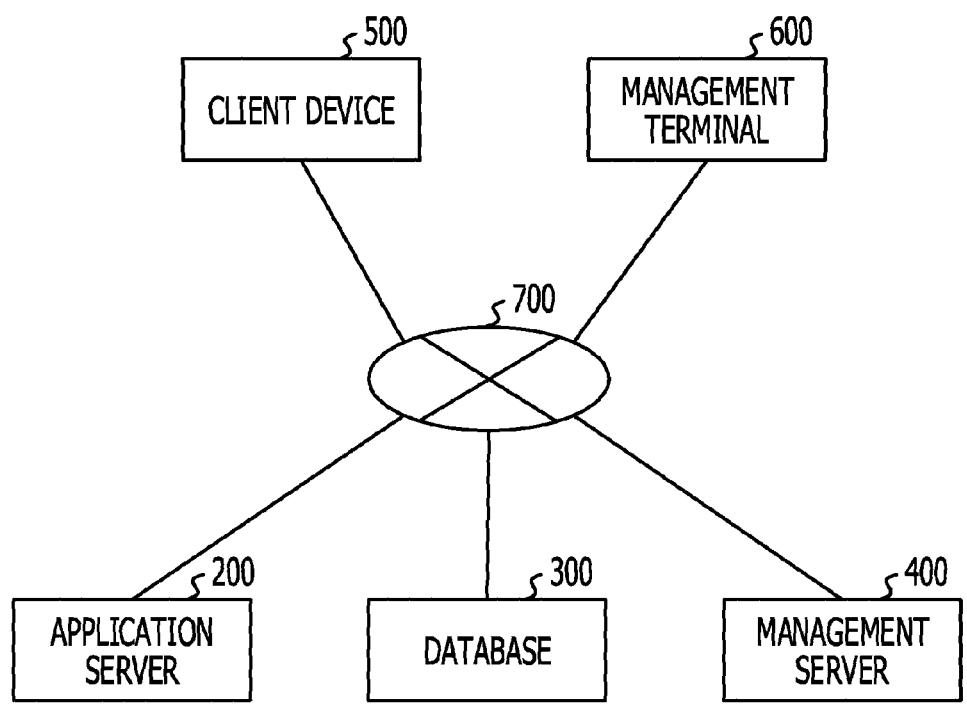
FIG. 1 illustrates an information processing system.

FIG. 1 illustrates an information processing system 100. The information processing system 100 includes an application server 200, a database 300, a management server 400, a client device 500, and a management terminal 600. The application server 200, the database 300, the management server 400, the client device 500, and the management terminal 600 are coupled to each other through a network 700 such as a local area network (LAN) and may communicate with each other. The application server 200, the database 300, and the management server 400 may be achieved by server devices. As the client device 500 and the management terminal 600, personal computers (PCs) may be used.

The application server 200 is a device that executes an application in the information processing system 100. The database 300 is a device that stores data that is used for the application to be executed by the application server 200. The management server 400 is a device that manages and controls the application server 200 and the database 300. The client device 500 is, for example, a device to which a result of the execution of the application by the application server 200 is output. The management terminal 600 is a device to which a result of a process executed by the management server 400 is output.

Figure 2:
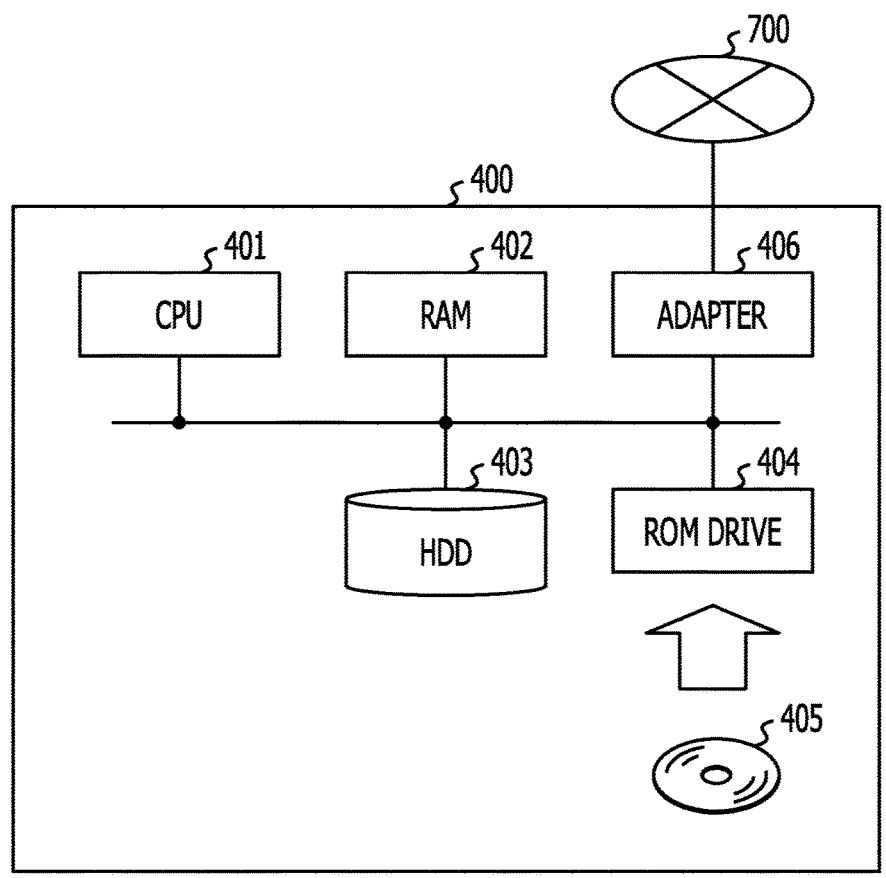
FIG. 2 illustrates an example of a hardware configuration of a management server.

FIG. 2 is a diagram illustrating an example of a hardware configuration of the management server 400. The management server 400 includes a central processing unit (CPU) 401, a random access memory (RAM) 402, a hard disk drive (HDD) 403, a read only memory (ROM) drive 404, and an adapter 406 that are coupled to each other through a bus and may communicate with each other. The CPU 401 executes arithmetic processing and the like in the management server 400. Data and a program that are used for the arithmetic processing to be executed by the CPU 401 are loaded into the RAM 402, for example. The HDD 403 stores data that is used for the process to be executed by the management server 400. In addition, the HDD 403 may store the program to be executed by the CPU 401. A storage device that is a semiconductor storage device, a magnetic tape storage device, or the like and is not an HDD may be used instead of the HDD 403. The ROM drive 404 is a reading device that may read information stored in a ROM disk 405 and load the read information into the RAM 402, for example. The ROM disk 405 may store the program to be executed by the management server 400. The CPU 401 may load the program stored in the ROM disk 405 into the RAM 402 through the ROM drive 404 and execute the loaded program. The adapter 406 is a connecting device that connects the management server 400 to the network 700. If the network 700 is a LAN, a LAN adapter is used as the adapter 406.

If server devices are used as the application server 200 and the database 300, hardware configurations of the application server 200 and database 300 may be the same as the hardware configuration of the management server 400 illustrated in FIG. 2.

Figure 3:
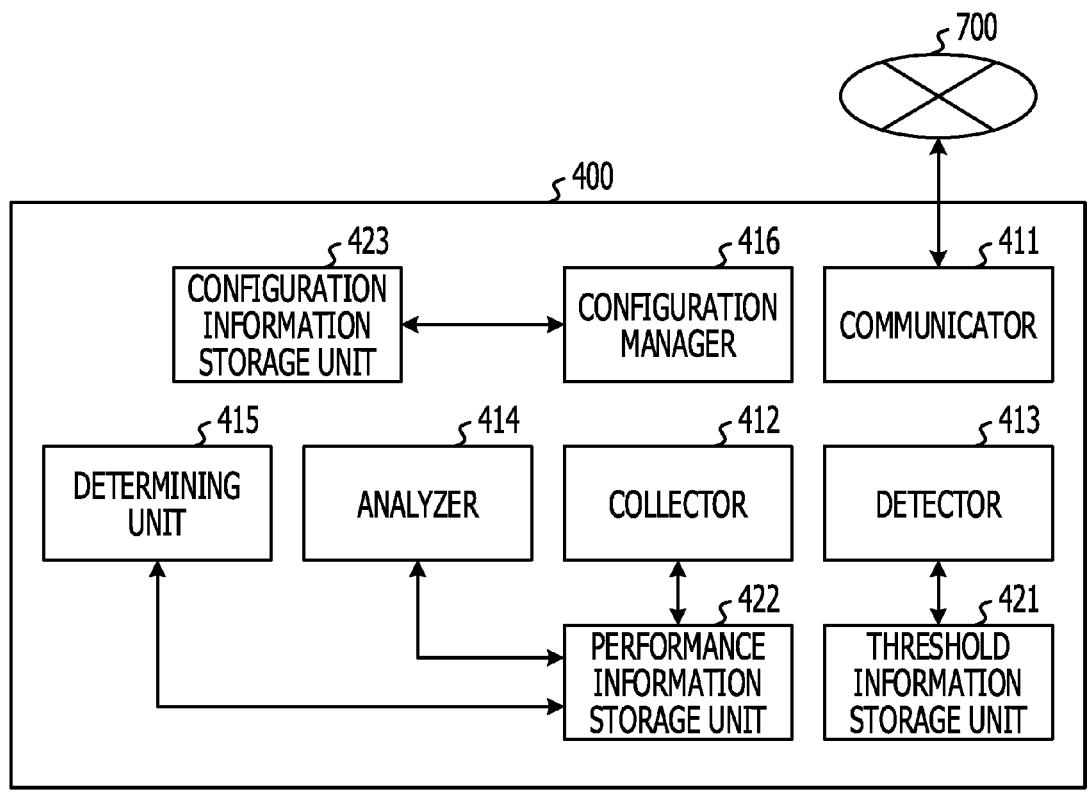
FIG. 3 is a functional block diagram illustrating the management server.

FIG. 3 is a functional block diagram illustrating the management server 400. The management server 400 includes a communicator 411, a collector 412, a detector 413, an analyzer 414, a determining unit 415, and a configuration manager 416 as functional units.

The communicator 411 transmits and receives data to and from the application server 200, the database 300, the client device 500, and the management terminal 600 through the network 700.

The collector 412 collects performance information of the application server 200 and database 300 during the execution of the application. The performance information is described later in detail.

The detector 413 collects information of response times of the application to the client device 500 and detects a delay of a response.

The analyzer 414 calculates a correlation function between the response times and processing times of each of elements of the application on the basis of information stored in a performance information storage unit 422 (described later) if the detector 413 detects the delay of the response.

The determining unit 415 determines whether or not there is a correlation between the response times to the client device 500 and processing times of each of the elements of the application. In addition, the determining unit 415 extracts, as the cause of the delay of the response, an element that has a correlation with the response times to the client device 500.

The configuration manager 416 manages components involved in the execution of the application and information that indicates connection relationships between the components. The information that is managed by the configuration manager 416 is stored in a configuration information storage unit 423 (described later).

The collector 412, the detector 413, the analyzer 414, the determining unit 415, and the configuration manager 416 may be achieved by causing the CPU 401 (illustrated in FIG. 2) to execute the program stored in the HDD 403, for example. In this case, the program that is stored in the HDD 403 may be loaded into the RAM 402. In addition, the connecting device that is the adapter 406 (illustrated in FIG. 2) or the like may be used as the communicator 411.

The management server 400 includes a threshold information storage unit 421, the performance information storage unit 422, and the configuration information storage unit 423.

The threshold information storage unit 421 stores information that specifies a threshold that is a standard for a delay of a response time to the client device 500.

The performance information storage unit 422 stores the performance information, collected by the collector 412 during the execution of the application, of the application server 200 and database 300.

The configuration information storage unit 423 stores the information that indicates the elements of the application to be executed by the application server 200 and specifies dependence relationships of the elements.

The threshold information storage unit 421, the performance information storage unit 422, and the configuration information storage unit 423 may be achieved by the HDD 403 and the RAM 402 that are illustrated in FIG. 2, for example.

DEFINITION INFORMATION

FIG. 4 is a diagram illustrating an example of the information stored in the configuration information storage unit 423. As illustrated in FIG. 4, the configuration information storage unit 423 stores configuration information 800 that is used for a process to be executed by the application server 200 and specifies relationships among components and applications, for example. For example, in FIG. 4, the configuration information 800 specifies that components that are virtual-server 211, network-listeners 212, 213, thread-pool 214, web applications 215, 216, jdbc-resource 223, and jdbc-connection-pool 224 are included. The web application 215 executes a process through virtual-server 211, network-listener 212 (or 213), and thread-pool 214 in accordance with a request from the client device 500. The web application 215 accesses the database 300 during the execution of the process, while jdbc-resource 223 and jdbc-connection-pool 224 control a connection of the web application 215 to the database 300.

FIGS. 5 and 6 are diagrams illustrating an example of definition information of the application server 200. Definition information 900 that is illustrated in FIGS. 5 and 6 is information that defines applications to be executed by the application server 200 and components. FIGS. 5 and 6 illustrate a part of the definition information 900. The configurations of the applications illustrated in FIG. 4 may be identified by the configuration manager 423 (illustrated in FIG. 3) on the basis of the definition information 900.

For example, information 901 illustrated in FIG. 5 defines that jdbc-resource 223 and jdbc-connection-pool 224 are included as components.

For example, information 904 illustrated in FIG. 6 defines a component connection state in which http-thread-pool 214 is connected at the subsequent stage of http-listeners 212, 213.

For example, information 906 illustrated in FIG. 6 defines a component connection state in which network-listeners 212, 213 are connected at the subsequent stage of virtual-server 211. The applications to be executed by the application server 200, the components, and connection relationships (as illustrated in FIG. 4) among the applications and the components may be identified on the basis of the definition information 900 illustrated in FIGS. 5 and 6.

Figure 7:
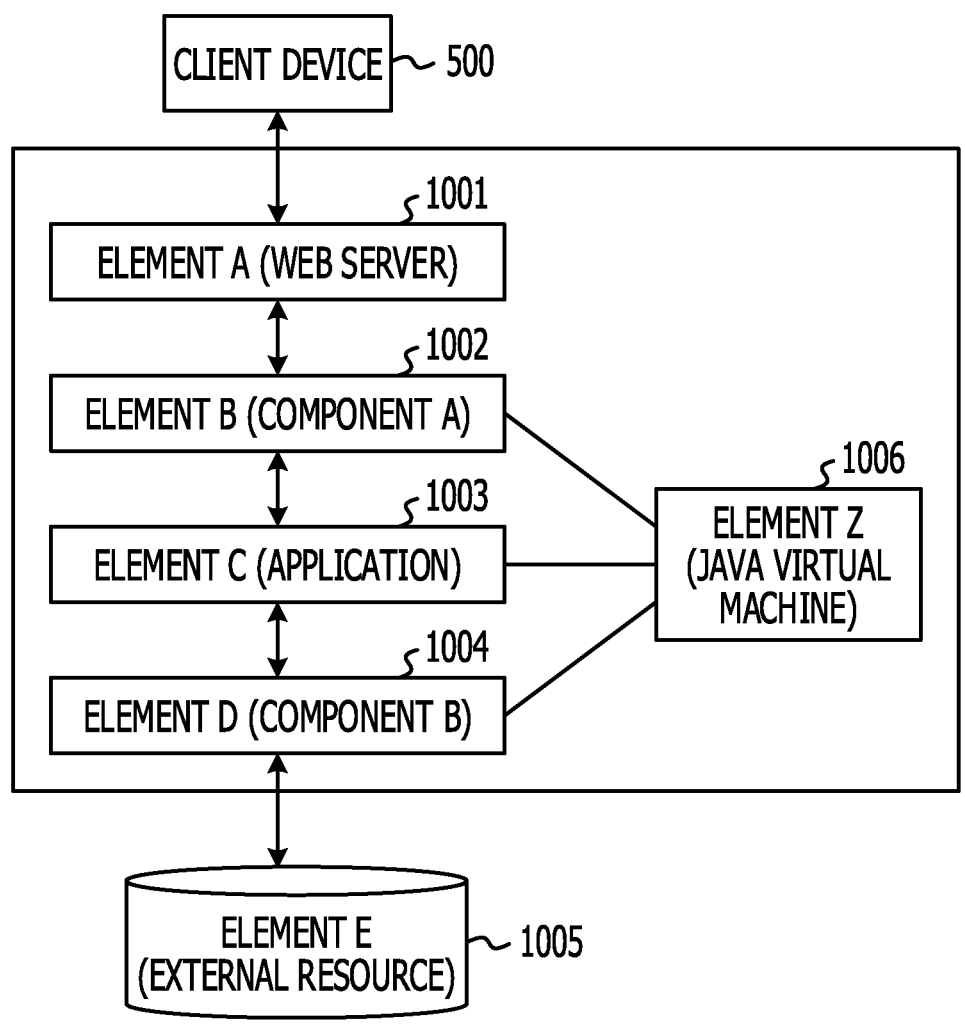
FIG. 7 illustrates the state of an application to be subjected to a process of identifying the cause of a delay.

FIG. 7 is a diagram describing a process according to the embodiment and illustrating the state of an application to be subjected to the process of identifying the cause of a delay. The state of the application illustrated in FIG. 7 is identified on the basis of the information stored in the configuration information storage unit 423, for example. As illustrated in FIG. 7, in the embodiment, the application to be executed by the application server 200 is achieved by an element A (web server) 1001, an element B (component A) 1002, an element C (application) 1003, an element D (component B) 1004, and an element E (external resource) 1005. The element B (component A) 1002, the element C (application) 1003, and the element D (component B) 1004 are achieved by a Java (registered trademark) virtual machine 1006 (indicated by an element Z in FIG. 7). For example, the element B (component A) 1002 and the element D (component B) 1004 are components included in the configuration information 800, and the element C (application) 1003 is an application included in the configuration information 800.

The element A (web server) 1001 receives a request from the client device 500 and transmits details of the request to the element B (component A) 1002. The element B (component A) 1002 that receives the request from the web server 1001 causes the element C (application) 1003 to execute a process in accordance with the request. In order to execute the process in accordance with the request, the element C (application) 1003 extracts data to be processed from the element E (external resource) 1005 through the element D (component B) 1004. The external resource is a database that stores information to be used for the execution of the application. After extracting the data to be processed from the element E (external resource) 1005, the element C (application) 1003 processes the data (to be processed) and transmits a result of processing the data to the client device 500 through the element B (component A) 1002 and the element A (web server) 1001. A time period from the start to end of the series of processes is referred to as a "response time" in this specification.

Collection of Performance Information

For the execution of the application by the application server 200, the collector 412 of the management server 400 acquires the performance information through the communicator 411 and causes the acquired performance information to be stored in the performance information storage unit 422. The performance information is information on the process to be executed by the application server 200 and information on processes to be executed by the elements of the application. Specifically, the information on the process to be executed by the application server 200 is a response time from the reception of the request by the application server 200 from the client device 500 to the transmission of the response to the request to the client device 500, for example. The information on the processes to be executed by the elements are times for the elements to execute the processes, for example. In this specification, the times for the elements to execute the processes are referred to as "processing times".

FIG. 8 is a diagram illustrating an example of the information collected by the collector 412 and stored in the performance information storage unit 422. Performance information 1100 illustrated in FIG. 8 is information that stores response times and processing times of the elements included in the application. If the application includes the element A 1001, the element B 1002, the element C 1003, the element D 1004, and the element E 1005 as illustrated in FIG. 5, the performance information 1100 includes acquisition times 1101, response times 1102, processing times 1103 of the element A, processing times 1104 of the element B, processing times 1105 of the element C, processing times 1106 of the element D, processing times 1107 of the element E, and processing times 1108 of the element Z, as illustrated in FIG. 8.

When the application server 200 executes the application in accordance with the request from the client device 500, the collector 412 collects the response times and the processing times of the elements A, B, C, D, E, and Z periodically (for example, once every minute) and causes the collected values to be stored in the performance information storage unit 422.

The response times (as illustrated in FIG. 8) and the processing times (as illustrated in FIG. 8) are stored in the performance information storage unit 422 by the process executed by the collector 412.

The collector 412 may collect performance information other than the response times and the processing times. In this case, examples of the other performance information are the numbers (the numbers of queues) of task items stored in the queues of a thread pool and the numbers of pending connections of a Java (registered trademark) database connectivity (JDBC) pool. The thread pool is a component that causes a request received from the client device 500 to be stored in a queue. The thread pool corresponds to http-thread-pool 214 illustrated in FIG. 4, for example. The JDBC pool is a component that controls a connection of the Java (registered trademark) virtual machine to the database. The JDBC pool corresponds to jdbc-connection-pool 224 illustrated in FIG. 4, for example.

Threshold for Detection of Delay

FIG. 9 is a diagram illustrating an example of the information stored in the threshold information storage unit 421. Threshold information 1200 illustrated in FIG. 9 stores a value that is a standard for detection of a delay of a process by the detector 413. For example, the threshold information 1200 indicates that a threshold for a response time is 3000 milliseconds. If a response time that is acquired by the collector 412 exceeds 3000 milliseconds, the detector 413 determines that a delay of the process occurs. In the embodiment, the threshold stored in the threshold information is a fixed value, but may be dynamically changed on the basis of a response time collected by the collector 412. For example, the threshold may be 1.5 times as large as the average of response times collected by the collector 412.

Process of Identifying Cause

In the embodiment, the process of identifying the cause of a delay is executed by the management server 400 and described below with reference to FIGS. 10 and 11.

Figure 10:
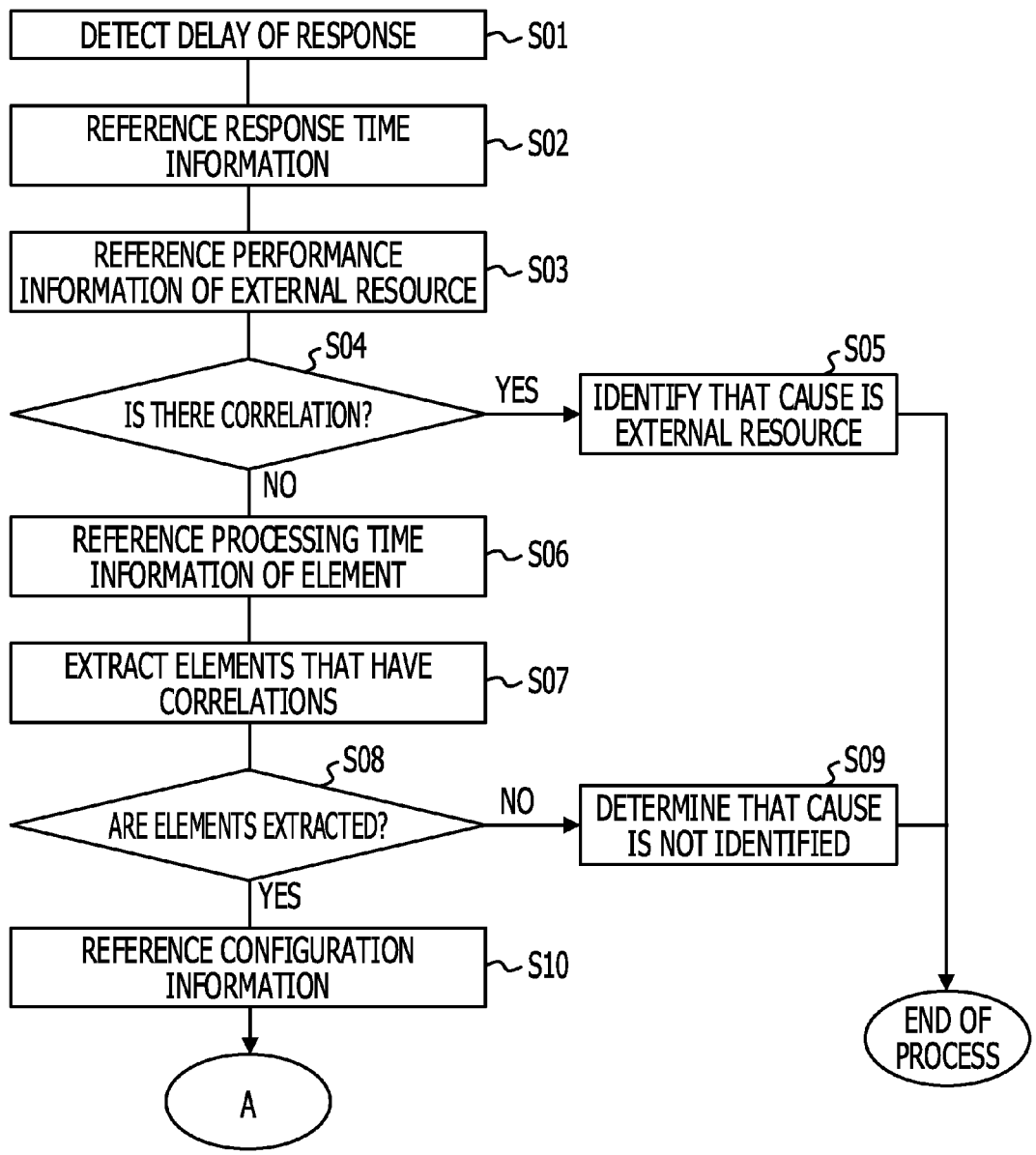
FIG. 10 is a flowchart of the process of identifying the cause of a delay by the management server.

FIG. 10 is a flowchart of a procedure from step S01 of detecting a delay of a response to step S10 of referencing the configuration information in order to identify the cause of the delay, while the procedure illustrated in FIG. 10 is executed by the management server 400.

First, the detector 413 detects a delay of a response on the basis of the response times 1102 stored in the performance information storage unit 422 and the threshold information 1200 stored in the threshold information storage unit 421 (S01). Specifically, if a response time 1102 collected by the collector 412 and stored in the performance information storage unit 422 exceeds the value (threshold) stored in the threshold information 1200, the detector 413 detects that a delay of the response occurs. For example, as indicated by performance information 1110 illustrated in FIG. 8, a response time 1102 that corresponds to an acquisition time of "Feb. 10, 2012, 10:11" is 4957 milliseconds exceeding 3000 milliseconds indicated by the threshold information 1200. Thus, the detector 413 detects that a delay of the response occurs.

Regarding the detection of a delay of a response, a response time may be unexpectedly long. Thus, if the detector 413 detects that a response time exceeds the value indicated by the threshold information 1200 a predetermined number (for example, five) of times, the detector 413 may detect that a delay of the response occurs.

If the detector 413 detects the delay of the response, the determining unit 415 references the response times 1102 stored in the performance information storage unit 422 (S02). In addition, the determining unit 415 references performance information, stored in the performance information storage unit 422, of the external resource (S03). In the embodiment, the element E 1005 corresponds to the external resource as illustrated in FIG. 7, and the determining unit 415 references the processing times 1107, stored in the performance information storage unit 422, of the element E 1005.

Next, the determining unit 415 determines whether or not there is a correlation between the response times 1102 stored in the performance information storage unit 422 and the processing times 1107, stored in the performance information storage unit 422, of the element E (S04). A method for determining whether or not there is the correlation is described later in detail.

If the determining unit 415 determines that there is the correlation between the response times 1102 and the processing times 1107 of the element E 1005 in step S04, the determining unit 415 identifies that the cause of the delay of the response is the element E 1005 (S05). Specifically, the determining unit 415 determines that the delay of the response of the application server 200 to the client device 500 is caused by a delay of a process executed by the element E 1005 that is the external resource. After identifying the cause of the delay of the response, the management server 400 terminates the process (illustrated in FIG. 10) of identifying the cause of the delay.

If the determining unit 415 determines that there is no correlation between the response times 1102 and the processing times 1107 of the element E in step S04, the determining unit 415 references the processing times of the elements other than the element E 1005 that is the external resource (S06). In the embodiment, the determining unit 415 references the processing times 1103 of the element A, the processing times 1104 of the element B, the processing times 1105 of the element C, and the processing times 1106 of the element D from the performance information storage unit 422.

The determining unit 415 determines whether or not there is a correlation between the response times 1102 and the processing times, referenced in step S06, of each of the elements, and the determining unit 415 extracts elements of which processing times have correlations with the response times 1102 (S07). A specific method for determining whether or not there is a correlation is the same as or similar to the process of step S04 and described later in detail.

The determining unit 415 determines whether or not the elements of which the processing times have the correlations with the response times 1102 have been extracted as a result of the process of step S07 (S08). If the elements of which the processing times have the correlations with the response times 1102 are not extracted, the determining unit 415 determines that the cause of the delay of the response of the application is not identified (S09), and the determining unit 415 terminates the process illustrated in FIG. 10.

If the determining unit 415 extracts the elements of which the processing times have the correlations with the response times 1102 as a result of the process of step S07, the determining unit 415 references the configuration information 800 stored in the configuration information storage unit 423 (S10). After the execution of the process of step S10, the process proceeds to step S11 through a terminal A illustrated in FIGS. 10 and 11.

Figure 11:
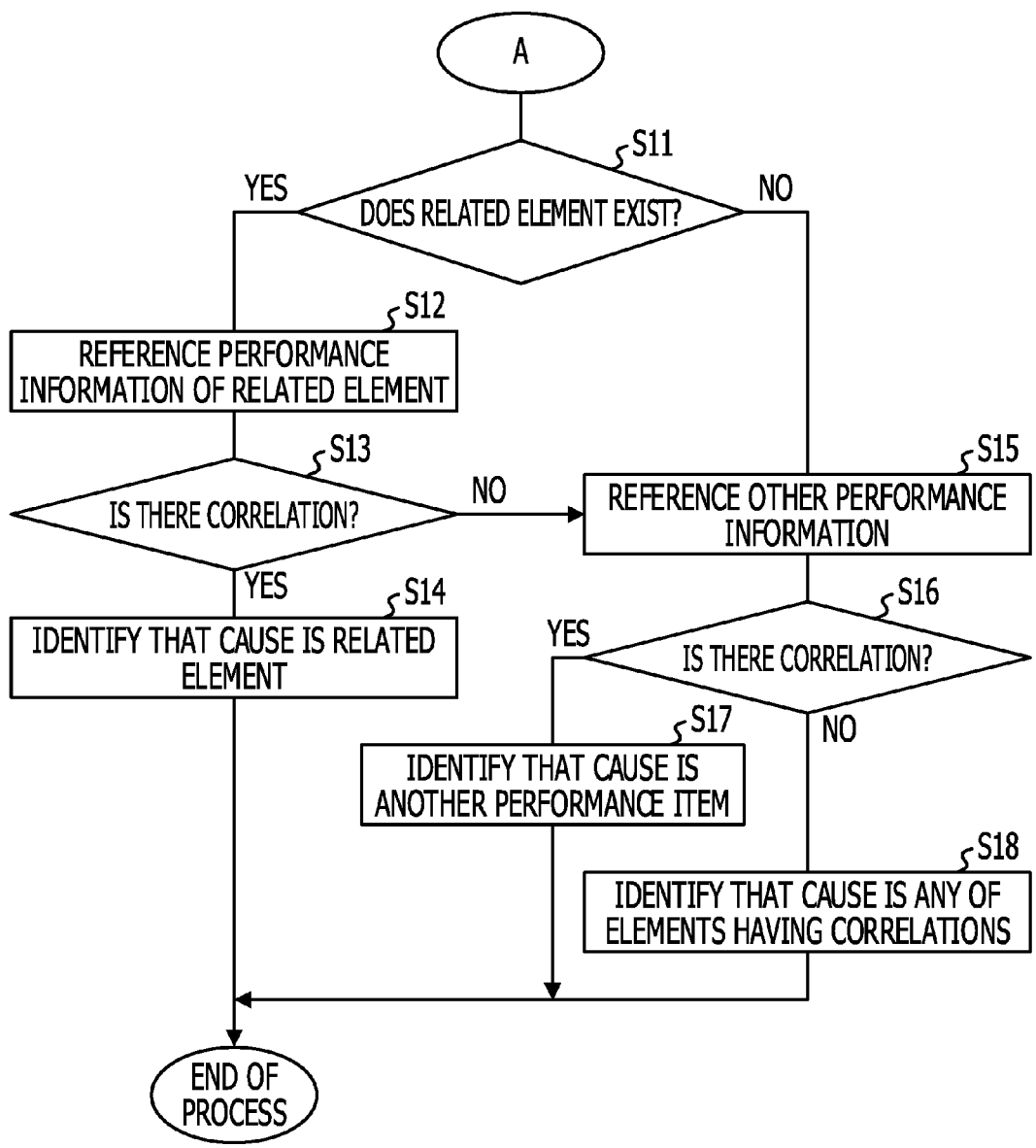
FIG. 11 is a flowchart of the process of identifying the cause of a delay by the management server.

FIG. 11 is a flowchart of a procedure from step S11 of determining whether or not an element that is related to all the elements extracted in step S07 exists to identification of the cause of the delay of the response, while the procedure illustrated in FIG. 11 is executed by the determining unit 415 of the management server 400.

The determining unit 415 determines whether or not an element (related element) that is related to all the elements extracted in step S07 exists (S11). In the embodiment, an element that is related to the element B 1002, the element C 1003, and the element D 1004 is the element Z 1006 as illustrated in FIG. 7, for example. If the elements extracted in step S07 are the element B 1002 and the element C 1003, the determining unit 415 determines that the element Z 1006 exists as the related element.

If the determining unit 415 determines that the related element exists as a result of the determination of step S11, the determining unit 415 references the processing times of the related element from the performance information stored in the performance information storage unit 422 (S12). Then, the determining unit 415 determines whether or not there is a correlation between the response times 1102 and processing times of the related element (S13). As a specific method for determining whether or not there is the correlation, a method that is the same as or similar to the processes of steps S04 and S07 is used and described later in detail.

If the determining unit 415 determines that there is the correlation between the response times 1102 and the processing times of the related element as a result of the determination of step S13, the determining unit 415 identifies that the cause of the delay of the response is the related element (S14). Specifically, the determining unit 415 determines that the delay of the response from the application server 200 to the client device 500 is caused by delays of processes executed by the elements extracted in step S07 and that the delays of the processes executed by the elements extracted in step S07 are caused by a delay of a process executed by the related element. After the identification, the determining unit 415 terminates the process.

As described above, according to the embodiment, if a response of the application is delayed, the cause of the delay of the response of the application may be identified on the basis of a correlation between response times and processing times of each of the elements of the application.

Details of Method for Determining Whether or not there is Correlation

The method for determining whether or not there is a correlation in steps S04, S07, and S13 is described below in detail.

The analyzer 414 calculates a correlation function between response times and processing times of each of the elements. The determining unit 415 determines whether or not there is a correlation between the response times and the processing times on the basis of the correlation function calculated by the analyzer 414. The correlation function is an index that indicates a degree of similarity of the two data groups to be compared. The correlation function to be used for the comparison is calculated according to a formula illustrated in FIG. 12.

For example, in order to calculate a correlation function between the response times 1102 and the processing times 1103 of the element A, a response time 1102 is substituted into x of the formula illustrated in FIG. 12 and a processing time, collected at the same time as the response time 1102 substituted into x, of the element A is substituted into y of the formula illustrated in FIG. 12. A range of response times to be substituted and a range of processing times to be substituted may be selected from the performance information stored in the performance information storage unit 422 on the basis of a certain requirement. For example, the response times to be substituted and the processing times to be substituted may be response times and processing times in a time period from 20 minutes before the start time of the process illustrated in FIGS. 10 and 11 to the start time of the process illustrated in FIGS. 10 and 11. The ranges to be selected may not be fixed and may be changed depending on the state of the information processing system 100. In the embodiment, the response times and the processing times in the time period from 20 minutes before the start time of the process illustrated in FIGS. 10 and 11 to the start time of the process illustrated in FIGS. 10 and 11 are performance information to be substituted into the formula illustrated in FIG. 12.

Values of the correlation functions that are calculated according to the aforementioned formula are in a range of −1 to 1. When the calculated correlation function is close to 1, the correlation is a positive correlation. When the calculated correlation function is close to −1, the correlation is a negative correlation.

The determining unit 415 determines, on the basis of the correlation functions calculated according to the aforementioned procedure, whether or not there is a correlation between the response times and the processing times of each of the elements. For example, if a correlation function, calculated by the determining unit 415, between the response times and processing times of an element is equal to or larger than 0.7, the determining unit 415 determines that there is a positive correlation between the response times and the processing times of the element. If the correlation function calculated by the determining unit 415 is equal to or smaller than −0.7, the determining unit 415 determines that there is a negative correlation between the response times and the processing times of the element. If the correlation function calculated by the determining unit 415 is larger than −0.7 and smaller than 0.7, the determining unit 415 determines that there is no correlation between the response times and the processing times of the element.

Specific examples are described below. When the determining unit 415 calculates a correlation function between the response times 1102 and the processing times 1103 of the element A on the basis of the performance information illustrated in FIG. 8, the calculated correlation function is −0.49 (rounded to the nearest hundredth). In this case, the determining unit 415 determines that there is no correlation between the response times 1102 and the processing times 1103 of the element A. When the determining unit 415 calculates a correlation function between the response times 1102 and the processing times 1104 of the element B on the basis of the performance information illustrated in FIG. 8, the calculated correlation function is 0.84 (rounded to the nearest hundredth). In this case, the determining unit 415 determines that there is a positive correlation between the response times 1102 and the processing times 1104 of the element B.

APPLICATION EXAMPLES

In the aforementioned description, if there is a correlation between the response times 1102 and the processing times of the related element in step S13, the cause of the delay of the response of the application may be identified. A method for identifying the cause of the delay of the response of the application even if there is no correlation between the response times 1102 and the processing times of the related element in step S13 is considered and described below. The method described below corresponds to the processes of steps S15 to S18 illustrated in FIG. 11.

If the determining unit 415 determines that there is no correlation between the response times 1102 and the processing times of the related element as a result of the determination of the aforementioned step S13, the determining unit 415 references performance information stored in the performance information storage unit 422 and excluding the processing times (S15). The performance information other than the processing times is the numbers of task items (numbers of queues) stored in the queues of the component that is the thread pool, the numbers of pending connections of the JDBC pool, or the like.

The determining unit 415 determines whether or not there is a correlation between the response times 1102 and the performance information other than the processing times (S16).

If the determining unit 415 determines that there is a correlation between the response times 1102 and the performance information other than the processing times as a result of the determination of step S16, the determining unit 415 identifies that the cause of the delay of the response is the related element (S17). Specifically, the determining unit 415 determines that the delay of the response from the application server 200 to the client device 500 is caused by a performance item indicated by the performance information used for the determination of step S16. After the identification, the determining unit 415 terminates the process (illustrated in FIGS. 10 and 11) of identifying the cause of the delay.

If the determining unit 415 determines that there is no correlation between the response times 1102 and the performance information other than the processing times as a result of the determination of step S16, the determining unit 415 identifies that the cause of the delay of the response is not the related element (S18). Specifically, the determining unit 415 determines that the delay of the response from the application server 200 to the client device 500 is caused by any of the elements extracted in step S07. After the identification, the determining unit 415 terminates the process (illustrated in FIGS. 10 and 11) of identifying the cause of the delay.

In order to determine whether or not there is a correlation between the response times 1102 and the performance information other than the processing times, a correlation function may be calculated and whether or not there is the correlation may be determined on the basis of the calculated correlation function. In this case, the performance information other than the processing times is the numbers of task items (numbers of queues) stored in the queues of the component that is the thread pool, the numbers of pending connections of the JDBC pool, or the like.

The following example describes the case where the numbers of task items stored in queues of the thread pool are used as an example of the other performance information. A process described below corresponds to step S16 illustrated in FIG. 11.

FIG. 13 illustrates an example of information that is collected by the collector 412 and stored in the performance information storage unit 422 and indicates transition of the number of items stored in queues of the thread pool during the execution of the application. For example, a part 1310 of information illustrated in FIG. 13 indicates that the number of queues stored in the thread pool on "Feb. 10, 2012 at 10:00 o'clock" is 3.

A process of determining whether or not there is a correlation between the response times and the number of stored queues is described below. A unit of collected response times is different from a unit of collected numbers of stored queues, unlike the process described above. In the embodiment, in order to avoid the difference, the analyzer 414 normalizes the performance information stored in the performance information storage unit 422.

Specifically, in the normalization method, the analyzer 414 identifies the minimum and maximum values among measured response times and the minimum and maximum values among measured numbers of stored queues in order to calculate a correlation function, for example. More specifically, a value after the normalization=((the value before the normalization)−(the minimum value before the normalization))/((the maximum value before the normalization)−(the maximum value after the normalization)). The performance information is normalized using the equation so that the maximum values are 1 and the minimum values are 0. For example, performance information of values of different units such as a time (milliseconds) and the number of stored queues may be compared by the normalization. When whether or not there is a correlation between response times and the numbers of stored queues is to be determined, the analyzer 414 uses the aforementioned method to normalize the response times and the numbers of the stored queues.

FIG. 14 illustrates response times 1402 normalized by the analyzer 414 and the numbers 1403, normalized by the analyzer 414, of stored queues. The analyzer 414 calculates a correlation function between the response times (normalized) 1402 and the numbers (normalized) 1403 of the stored queues on the basis of the performance information illustrated in FIG. 14. Then, the determining unit 415 determines, on the calculated correlation function, whether or not there is a correlation between the response times (normalized) 1402 and the numbers (normalized) 1403 of the stored queues. When the correlation function is calculated using the formula illustrated in FIG. 12, the correlation function between the response times (normalized) 1402 and the numbers (normalized) 1403 of the stored queues is 0.87 (rounded down to the hundredth). In this case, the determining unit 415 determines that there is a positive correlation between the response times (normalized) 1402 and the numbers (normalized) 1403 of the stored queues.

In the embodiment, the determining unit 415 may determine, on the basis of information stored in the performance information storage unit 422 and indicating response times and the numbers of stored queues, whether or not there is a correlation between the response times and the numbers of the stored queues in the aforementioned process of step S16. For example, if the determining unit 415 determines that there is the correlation between the response times and the numbers of the stored queues, the determining unit 415 identifies that the cause of the delay of the response is an increase in the number of queues stored in the thread pool.

In the embodiment, information of an element identified as the cause of a delay by the process executed by the management server 400, or information of a component or an external resource is output to the management terminal 600 illustrated in FIG. 1, for example. A system administrator uses the management terminal 600 to easily and quickly recognize the cause of the delay of a response of the application.

SUMMARY

According to the embodiment, if a response of the application executed by the application server 200 to the client device 500 is delayed, an element that causes the delay may be identified. According to the embodiment, the cause of the delay of the response of the application may be quickly identified, compared with conventional techniques, and the efficiency of operational management of the information processing system 100 that executes the application may be improved.

According to the embodiment, if a plurality of elements of which transition of processing times has correlations with transition of response times are extracted, an element (related element) on which the extracted elements commonly depend may be identified and the elements may be narrowed down to the element causing a delay or an element causing the delay.

According to the element, even if the cause of a delay of a response is not identified using response times and processing times, the cause of the delay of the response may be identified using performance information other than the processing times.

The embodiment is an aspect, and the specific processes described in the embodiment and the process procedures described in the embodiment may be changed on the basis of the state of the system to which the embodiment is applied.

For example, the times to collect the performance information and the types of the performance information to be collected may be changed on the basis of the state of the system. In addition, the threshold for the detection of a delay may be changed on the basis of the state of the system. The ranges of the performance information to be used to determine whether or not there is a correlation may be changed.

In the embodiment, in step S11 illustrated in FIG. 11, the determining unit 415 determines whether or not an element (related element) that is related to all the elements extracted in step S07 exists. The process of step S11 may be changed. For example, an element that is related to two or more elements among the elements extracted in step S07 may be extracted as the related element, and the determining unit 415 may determine that the cause of a delay of a response time is a delay of a process executed by the related element if the determining unit 415 determines that there is a correlation between response times and processing times of the related element.

Regarding items other than the aforementioned items, the specific processes described in the embodiment and the process procedures described in the embodiment may be changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A processing method comprising:
    collecting processing information indicating a response time of an application achieved by a plurality of processing elements and operational information indicating respective operational states of the processing elements that are identified on the basis of configuration information stored in a storage unit;
    calculating a correlation function between the response time and an operational state of each of the processing elements on the basis of the processing information and the operational information when a delay of a process of the application is detected on the basis of the processing information, the correlation function ranging between −1 and 1;
    determining that an operational state of a processing element of the plurality of processing elements has a correlation with the response time when the calculated correlation function indicates a positive correlation larger than a first given value, or when the calculated correlation function indicates a negative correlation less than a second given value; and
    extracting, from among the processing elements, a processing element of which the operational state has the correlation with the response time based on the determining.

2. The processing method according to claim 1, further comprising:
    identifying, on the basis of the configuration information, a processing element related to the processing element extracted from among the processing elements and having the correlation;
    collecting operational information that indicates an operational state of the related processing element;
    determining whether or not there is a correlation between the processing state and the operational state of the related processing element on the basis of the collected processing information and the operational information indicating the operational state of the related processing element; and
    extracting the related processing element when there is the correlation between the processing state and the operational state of the related processing element.

3. The processing method according to claim 1, further comprising:
    collecting operational information of an external resource to be accessed when the application is executed;
    determining whether or not there is a correlation between the processing state and an operational state of the external resource on the basis of the collected processing information and the operational information of the external resource; and
    extracting the external resource when there is the correlation between the processing state and the operational state of the external resource.

4. The processing method according to claim 3,
    wherein the processing information includes processing times, collected at predetermined time intervals, of the application, and
    wherein the operational information of the processing elements and the operational information of the related processing element include processing times, collected at the predetermined time intervals, of the processing elements, and the operational information of the external resource includes processing times, collected at the predetermined time intervals, of the external resource.

5. The processing method according to claim 4, further comprising:
    collecting second operational information indicating respective processing states of the processing elements, the second operational information being different from processing times;
    determining, on the basis of the processing information and the collected second operational information, whether or not there is a correlation between the response time of the application and the respective operational states of the processing elements, when a related processing element is not identified; and
    extracting a processing element when it is determined that there is a correlation between the response time of the application and the operational state of one of the processing elements from which the second operational information has been collected.

6. An apparatus comprising:
    a memory; and
    a processor coupled to the memory and configured to:
        collect processing information indicating a response time of an application achieved by a plurality of processing elements and operational information indicating respective operational states of the processing elements that are identified on the basis of configuration information stored in the memory,
        calculate a correlation function between the response time and an operational state of each of the processing elements on the basis of the processing information and the operational information when a delay of a process of the application is detected on the basis of the processing information, the correlation function ranging between −1 and 1,
        determine that an operational state of a processing element of the plurality of processing elements has a correlation with the response time when the calculated correlation function indicates a positive correlation larger than a first given value, or when the calculated correlation function indicates a negative correlation less than a second given value, and
        extract, from among the processing elements, a processing element of which the operational state has the correlation with the response time based on the determination.

7. The apparatus according to claim 6, wherein the processor is configured to:

identify, on the basis of the configuration information, a processing element related to the processing element extracted from among the processing elements and having the correlation, collect operational information that indicates an operational state of the related processing element, determine whether or not there is a correlation between the processing state and the operational state of the related processing element on the basis of the collected processing information and the operational information indicating the operational state of the related processing element, and extract the related processing element when there is the correlation between the processing state and the operational state of the related processing element.

8. The apparatus according to claim 6, wherein the processor is configured to:

collect operational information of an external resource to be accessed when the application is executed, determine whether or not there is a correlation between the processing state and an operational state of the external resource on the basis of the collected processing information and the operational information of the external resource, and extracting the external resource when there is the correlation between the processing state and the operational state of the external resource.

9. The apparatus according to claim 8, wherein the processing information includes processing times, collected at predetermined time intervals, of the application, and wherein the operational information of the processing elements and the operational information of the related processing element include processing times, collected at the predetermined time intervals, of the processing elements, and the operational information of the external resource includes processing times, collected at the predetermined time intervals, of the external resource.

10. The apparatus according to claim 9, wherein the processor is configured to:

collect second operational information indicating respective processing states of the processing elements, the second operation information being different from processing times, determine, on the basis of the processing information and the collected second operational information, whether or not there is a correlation between the response time of the application and the respective operational states of the processing elements, when a related processing element is not identified, and extract a processing element when it is determined that there is a correlation between the response time of the application and the operational state of one of the processing elements from which the second operational information has been collected.

11. A non-transitory computer-readable recording medium storing a program for causing a computer to execute a process, the process comprising:

collecting processing information indicating a response time of an application achieved by a plurality of processing elements and operational information indicating respective operational states of the processing elements that are identified on the basis of configuration information stored in a storage device;

calculating a correlation function between the response time and an operational state of each of the processing elements on the basis of the processing information and the operational information when a delay of a process of the application is detected on the basis of the processing information, the correlation function ranging between −1 and 1;

determining that an operational state of a processing element of the plurality of processing elements has a correlation with the response time when the calculated correlation function indicates a positive correlation larger than a first given value, or when the calculated correlation function indicates a negative correlation less than a second given value; and extracting, from among the processing elements, a processing element of which the operational state has the correlation with the response time based on the determining.

12. The non-transitory computer-readable recording medium according to claim 11, the process further comprising:

identifying, on the basis of the configuration information, a processing element related to the processing element extracted from among the processing elements and having the correlation;

collecting operational information that indicates an operational state of the related processing element;

determining whether or not there is a correlation between the processing state and the operational state of the related processing element on the basis of the collected processing information and the operational information indicating the operational state of the related processing element; and extracting the related processing element when there is the correlation between the processing state and the operational state of the related processing element.

13. The non-transitory computer-readable recording medium according to claim 11, the process further comprising:

collecting operational information of an external resource to be accessed when the application is executed;

determining whether or not there is a correlation between the processing state and an operational state of the external resource on the basis of the collected processing information and the operational information of the external resource; and extracting the external resource when there is the correlation between the processing state and the operational state of the external resource.

14. The non-transitory computer-readable recording medium according to claim 13, wherein the processing information includes processing times, collected at predetermined time intervals, of the application, and wherein the operational information of the processing elements and the operational information of the related processing element include processing times, collected at the predetermined time intervals, of the processing elements, and the operational information of the external resource includes processing times, collected at the predetermined time intervals, of the external resource.

15. The non-transitory computer-readable recording medium according to claim 14, the process further comprising:

collecting second operational information indicating respective processing states of the processing elements, the second operational information being different from processing times;

determining, on the basis of the processing information and the collected second operational information, whether or not there is a correlation between the response time of the application and the respective operational states of the processing elements, when a related processing element is not identified; and extracting a processing element when it is determined that there is a correlation between the response time of the application and the operational state of one of the processing elements from which the second operational information has been collected.

* * * * *